(12) United States Patent
Tezuka

(10) Patent No.: US 6,331,989 B1
(45) Date of Patent: Dec. 18, 2001

(54) MULTIPLEX TRANSMISSION METHOD AND SYSTEM

(75) Inventor: Hiroshi Tezuka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/025,262

(22) Filed: Feb. 18, 1998

(30) Foreign Application Priority Data

Feb. 18, 1997 (JP) .................................... 9-033749

(51) Int. Cl.$^7$ ........................ H04B 7/216; H04L 12/50; H04J 3/06
(52) U.S. Cl. .................... 370/535; 370/335; 370/365; 370/512; 375/356; 375/367
(58) Field of Search ................... 370/535, 536, 370/512, 544, 505, 506, 510, 365, 335, 350, 470, 478, 248, 509, 514, 515; 375/356, 361, 368, 367

(56) References Cited

U.S. PATENT DOCUMENTS

| | | | |
|---|---|---|---|
| 3,985,961 | * 10/1976 | Voss et al. ............................ | 179/506 |
| 4,247,936 | 1/1981 | Hustig . | |
| 4,602,367 | * 7/1986 | McDermott, II ..................... | 370/512 |
| 4,688,210 | * 8/1987 | Eizenhofer et al. ................. | 370/335 |
| 4,744,082 | * 5/1988 | Fujimura et al. .................... | 370/505 |
| 4,860,283 | * 8/1989 | Takano et al. ....................... | 370/470 |
| 4,879,731 | * 11/1989 | Brush .................................... | 375/116 |
| 4,977,558 | 12/1990 | Iguchi et al. . | |
| 5,677,935 | * 10/1997 | Karino ................................. | 375/368 |
| 5,715,239 | * 2/1998 | Hyodo et al. ........................ | 370/248 |

FOREIGN PATENT DOCUMENTS

| | | |
|---|---|---|
| 2 125 256 | 2/1984 | (GB) . |
| 2 143 405 | 2/1985 | (GB) . |
| 2 191 913 | 12/1987 | (GB) . |
| 2 302 484 | 1/1997 | (GB) . |
| 2 304 502 | 3/1997 | (GB) . |
| 63-60636 | 3/1988 | (JP) . |
| 63-60637 | 3/1988 | (JP) . |
| 63-114430 | 5/1988 | (JP) . |
| 2-73732 | 3/1990 | (JP) . |
| 2-256336 | 10/1990 | (JP) . |
| 4-114527 | 4/1992 | (JP) . |
| 5-68013 | 3/1993 | (JP) . |
| 5-336143 | 12/1993 | (JP) . |
| 6-120925 | 4/1994 | (JP) . |
| 6-261018 | 9/1994 | (JP) . |
| 7-95187 | 4/1995 | (JP) . |
| 7-99493 | 4/1995 | (JP) . |
| 7-135506 | 5/1995 | (JP) . |
| 7-135507 | 5/1995 | (JP) . |
| 7-307719 | 11/1995 | (JP) . |
| 8-56223 | 2/1996 | (JP) . |
| 8-204677 | 8/1996 | (JP) . |
| 9-205410 | 8/1997 | (JP) . |

\* cited by examiner

Primary Examiner—Wellington Chin
Assistant Examiner—M Phan
(74) Attorney, Agent, or Firm—Sughrue, Mion, Zinn, Macpeak & Seas, PLLC

(57) ABSTRACT

In a multiplex transmission method, a plurality of digital signals having different frame lengths and bit-synchronized at the same signal rate are transmitted after the signals are multiplexed in a predetermined order. The received multiplexed signal is demultiplexed. A predetermined sync pattern is detected from each digital signal obtained by demultiplexing. The output position of each digital signal is determined on the basis of the sync pattern detection result. A multiplex transmission system is also disclosed.

6 Claims, 4 Drawing Sheets

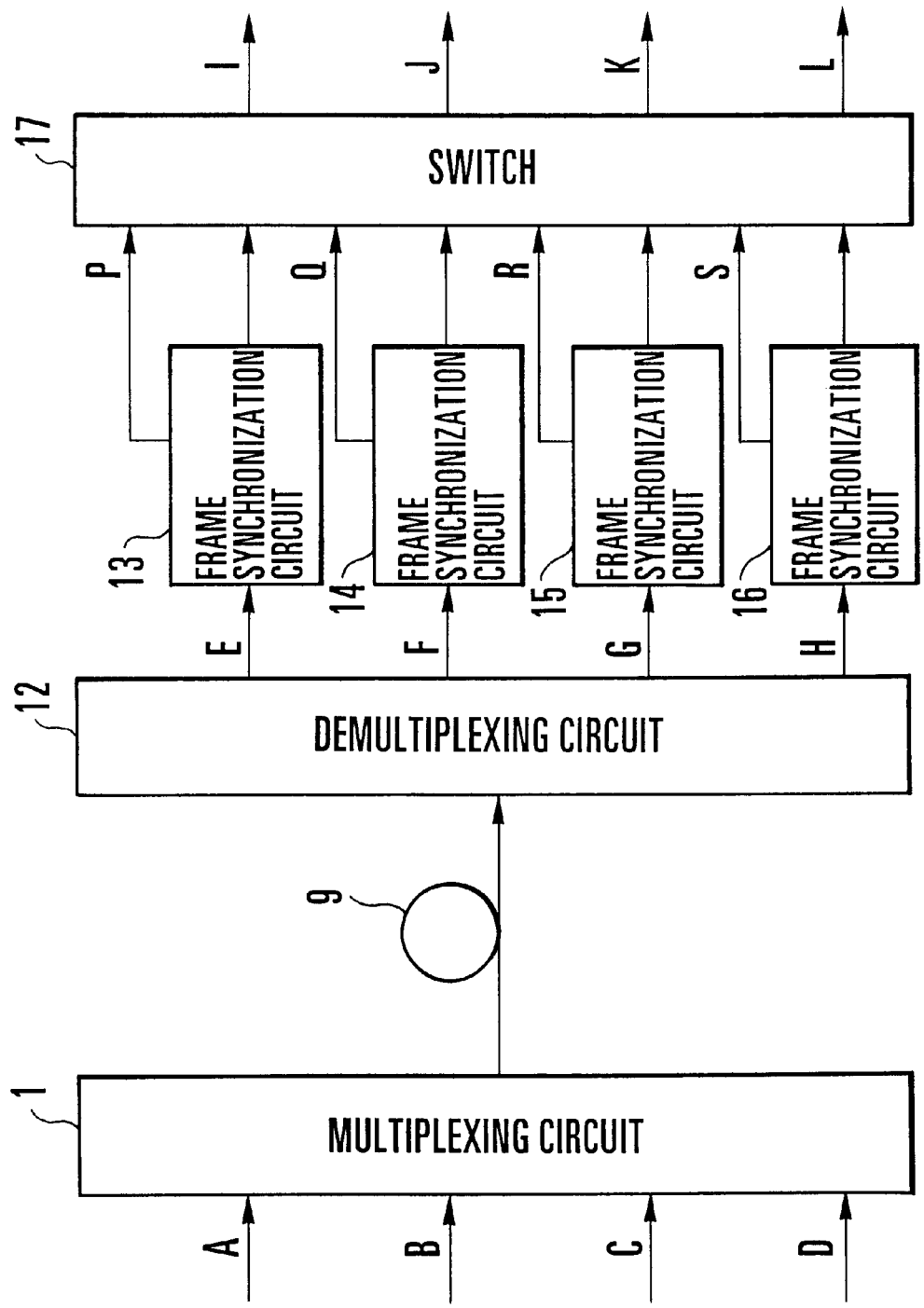
F I G. 2

MULTIPLEX TRANSMISSION METHOD AND SYSTEM

BACKGROUND OF THE INVENTION

The present invention relates a multiplex transmission method and system and, more particularly, to a multiplex transmission method and system used in a high-speed optical subscriber system for distributing larger-volume signals, each obtained by multiplexing various signals and having a volume of G (Giga) bits/s.

Efforts have recently been made to standardize the specifications of B-ISDNs (Broadband Integrated Services Digital Networks) using the asynchronous transfer mode (to be referred to as the ATM hereinafter) according to an ITU-T recommendation. In the ATM, AALs (ATM Adaptation Layers) are used to form signals having various signal rates into ATM cells to allow any signals to be handled in a transmission line in the same manner, thereby realizing high-speed network processing. To form various signals into ATM cells, a CLAD (Cell Assembly and Disassembly) LSI is used to assemble the signals into cells on AALs defined for the respective signals.

As an ATM multiplexing method, a method called cell multiplexing is used. In this method, a plurality of cells are multiplexed on the time axis in units of cells to realize a method of transmitting signals to a high-speed transmission line. FIG. 4 explains a conventional multiplexing method based on cell multiplexing. In general, on a transmission line such as a trunk system or a LAN (Local Area Network), ATM cells are mapped according to VC-3 on OC-3 to be transmitted. As an ATM cell multiplexing scheme, a system for relaying/transmitting synchronous transfer mode (to be referred to as STM hereinafter) signals through an ATM network has been proposed, as disclosed in Japanese Patent Laid-Open No. 7-99493 (reference 1).

Referring to FIG. 4, an existing network I/F section 51 converts an STM reception signal into transmission data and a transmission frame sync signal indicating the start position of an STM frame. The STM reception signal has an STM frame configuration constituted by a plurality of time slots. All or some of these time slots are divided into a plurality of groups, and each group is provided as a basic line.

A cell assembly section 52 starts counting time slot numbers in response to a transmission frame sync signal from the existing network I/F section 51, and recognizes specific basic lines for which the respective time slots have been provided in accordance with the count values. Transmission data from the existing network I/F section 51 are sequentially accommodated in ATM cells having different virtual path identifiers (to be referred to as VPIs hereinafter) and virtual channel identifiers (to be referred to as VCIs hereinafter) for the respective basic lines.

In this manner, the cell assembly section 52 assembles ATM cells each having, in its information field, information indicating the presence/absence of the start time slot of an STM signal frame on a basic line in the information field and pointer information indicating the position of the start time slot, and outputs the cells as an ATM transmission signal to an ATM network through a user network I/F section 53.

The ATM cells received from the ATM network are separated in units of basic lines by using VPIs and VCIs, and STM transmission signals are regenerated from the respective ATM cells by using the pieces of pointer information in units of basic lines.

More specifically, in the user network I/F section 53, an ATM reception signal is converted into cells according to a predetermined format to obtain reception cells. A cell disassembly section 54 disassembles the reception cells from the user network I/F section 53 on the basis of the VPIs and the VCIs to receive the resultant data as time slot data in units of basic lines. The received time slot data are multiplexed to output reception data having an STM frame configuration. In addition, a reception frame sync signal is generated on the basis of information indicating the presence/absence of a start time slot.

In the existing network I/F section 51, the reception data and the reception frame sync signal from the cell disassembly section 54 are converted into an STM transmission signal to be output. Note that the arrangements of the cell assembly section 52 and the cell disassembly section 54 are disclosed in detail in reference 1.

As described above, in the conventional system shown in FIG. 4, when various signals are to be transmitted after they are disassembled into ATM cells and accommodated, a high-speed network is realized, and the band utilization efficiency is increased in trunk transmission owing to a statistic multiplex effect.

In such a conventional multiplex transmission system, however, original signals are simply multiplexed in the form of cells on the transmission system (side) for an ATM network, and only necessary signals are simply demultiplexed into cells on the receiver (side) for the ATM network. For this reason, when this system is used for transmission in a subscriber system such as a PDS (Passive Double Star) system using an optical fiber, original signals must be multiplexed in the form of cells to be transmitted in units of subscribers in accordance with the signal output positions of a demultiplexing circuit in the receiver.

When, therefore, broadcast signals such as CATV (CAble TeleVision) signals are to be distributed to the respective subscribers, identical signals concurrently flow on a transmission line in large quantities, resulting in a decrease in transmission line utilization efficiency.

In addition, with an increase in signal rate for transmission to subscribers, a circuit for multiplexing cells becomes complicated, resulting in difficulty in realizing a high-speed operation.

SUMMARY OF THE INVENTION

It is an object of the present invention to provide a multiplex transmission method and system which allow a simple circuit arrangement without decreasing the transmission line utilization efficiency even when broadcast signals such as CATV signals are to be distributed.

In order to achieve the above object, according to the present invention, there is provided a multiplex transmission method comprising the steps of transmitting a plurality of digital signals having different frame lengths and bit-synchronized at the same signal rate upon multiplexing the signals in a predetermined order, demultiplexing a received multiplexed signal, detecting a predetermined sync pattern from each digital signal obtained by demultiplexing, and determining an output position of each digital signal on the basis of the sync pattern detection result.

BRIEF DESCRIPTION OF THE DRAWINGS

FIG. 2 is a block diagram showing a multiplex transmission system according to the second embodiment of the present invention;

DESCRIPTION OF THE PREFERRED EMBODIMENTS

The present invention will be described in detail below with reference to the accompanying drawings.

Figure 1:
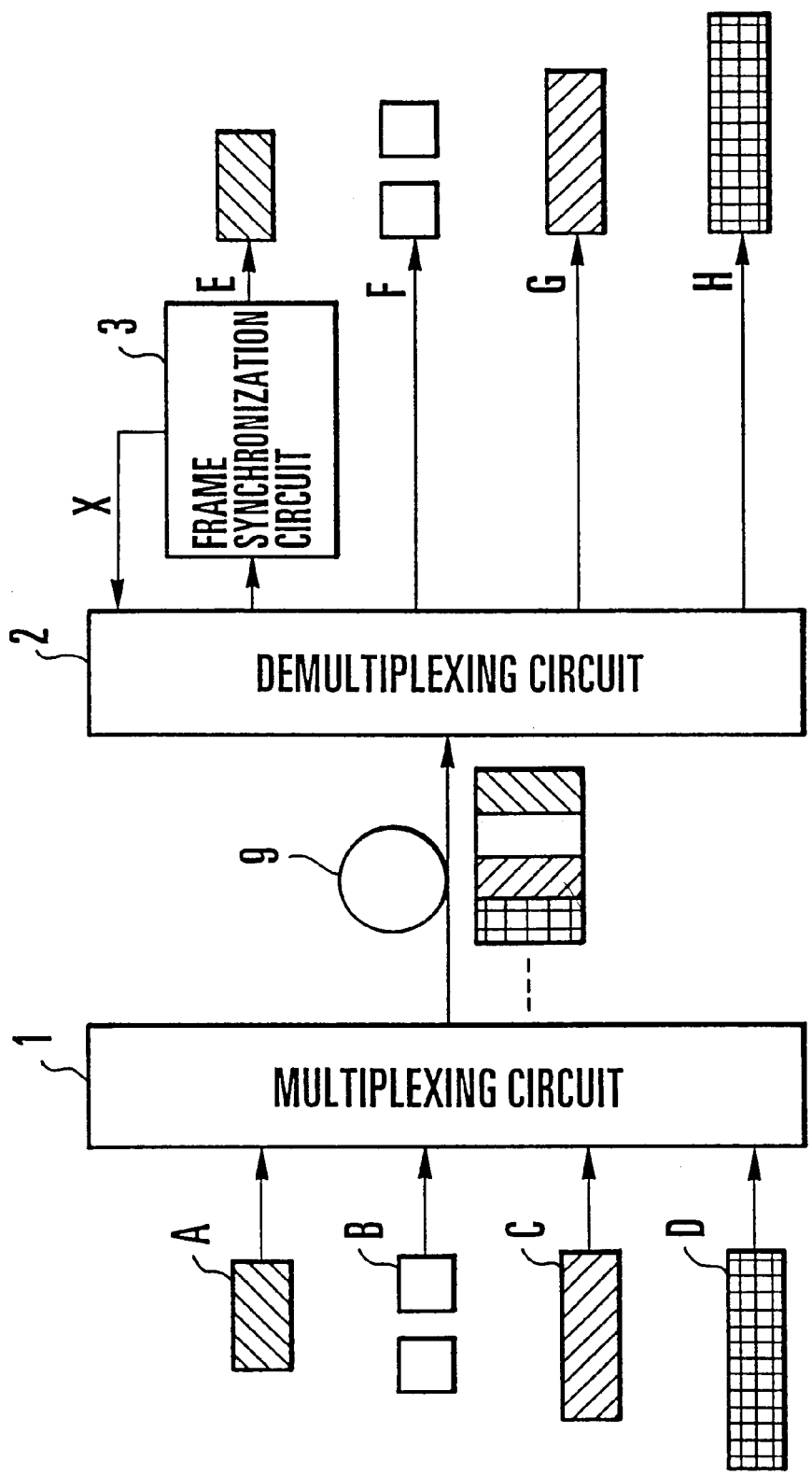
FIG. 1 is a block diagram showing a multiplex transmission system according to the first embodiment of the present invention.

FIG. 1 shows a multiplex transmission system according to the first embodiment of the present invention. In this case, four types of signals clock-synchronized at 150 Mb/s are handled as signals to be multiplexed.

Referring to FIG. 1, reference symbols A to D denote four types of signals to be multiplexed. Assume that an STM-1 frame signal having a frame length of 2,430 bytes is transferred as the signal A; an ATM cell signal having a cell length of 53 bytes, as the signal B; a signal having a frame length of 4,700 bytes, obtained by multiplexing 25 MPEG (Motion Picture Image Coding Experts Group) 2 transport streams, as the signal C; and a variable-length IP (Internet Protocol) packet, as the signal D.

The transmitter uses a multiplexing circuit 1 for bit-multiplexing the above four types of signals. In this case, the signals A, B, C, and D are time-divisionally multiplexed in the order named. The receiver is constituted by a demultiplexing circuit 2 for bit-demultiplexing the above multiplexed signal received from the transmitter through an optical fiber 9 and a frame synchronization circuit 3. Four outputs E, F, G, and H from the demultiplexing circuit 2 are output in the temporal order with respect to input signals. The signal output positions of the demultiplexing circuit 2, i.e., the data phases, are changed (rotated) in accordance with a bit rotate signal (designation signal) X output from the frame synchronization circuit 3.

The frame synchronization circuit 3 is connected to only the output port for the output E of the demultiplexing circuit 2 to detect an STM-1 frame sync byte. In this case, when frame synchronization cannot be established for a predetermined period (1.25 ms), the frame synchronization circuit 3 outputs the bit rotate signal X to the demultiplexing circuit 2.

Bit multiplexing in the present invention is one of the time slot fixed allocation schemes in which a predetermined signal (channel) uses time slots arranged at time intervals on a multiplex line in a fixed manner. In this scheme, signals are multiplexed while 1-bit data of each signal is allocated to one time slot.

The operation of the system having the above arrangement will be described next. In the transmitter, the signals A to D are input to the multiplexing circuit 1, in which they are time-divisionally bit-multiplexed to be output to the optical fiber 9. In the receiver, the demultiplexing circuit 2 receives the multiplexed signal from the transmitter through the optical fiber 9, bit-demultiplexes the signal, and outputs the signals A to D as the outputs E to H.

In the initial state, in accordance with signal phases, the signal C is output as the output E from the demultiplexing circuit 2; the signal D, as the output F; the signal A, as the output G; and the signal B, as the output H. In this case, the frame synchronization circuit 3 detects an STM-1 frame synchronization byte from the signal C as the output E.

As described above, since the signal C is obtained by multiplexing 25 MPEG 2 transport streams, the frame synchronization circuit 3 cannot detect any STM-1 frame synchronization byte. For this reason, the bit rotate signal X is output to the demultiplexing circuit 2 after a lapse of a predetermined period, i.e., 1.25 ms, since the start of output of the signal C as the output E, i.e., the start of synchronization detection in the signal C by the frame synchronization circuit 3.

Upon reception of the bit rotate signal P, the demultiplexing circuit 2 changes the output positions of the output signals A to D, i.e., the data phases of the output signal A to D with respect to the outputs E to H, and respectively output the signals B, C, D, and A as the outputs E, F, G, and H. Thereafter, the frame synchronization circuit 3 performs synchronization detection with respect to the signal B as the output E in the same manner as described above. In this case, since the signal B is the ATM cell signal, as described above, the frame synchronization circuit 3 cannot detect any STM-1 frame sync byte.

The bit rotate signal X is therefore output after a lapse of 1.25 ms since the start of output of the signal B as the output E, i.e., the start of synchronization detection in the signal C by the frame synchronization circuit 3. In response to the signal P, the demultiplexing circuit 2 changes the data phases of the output signals A to D with respect to the outputs E to H, and outputs the signals A, B, C, and D respectively as the outputs E, F, G, and H.

Subsequently, the frame synchronization circuit 3 performs synchronization detection with respect to the signal A as the output E in the same manner as described above. In this case, as described above, since the signal A is the STM-1 frame signal, an STM-1 frame sync byte can be detected. With this operation, frame synchronization is established, and the frame synchronization circuit 3 stops outputting the bit rotate signal X. As a result, the signals A to D corresponding to the outputs E to H of the demultiplexing circuit 2 are not changed and fixed.

According to this embodiment, in the transmitter, a plurality of signals having arbitrary frame lengths and clock-synchronized at the same signal rate (bit/s) are time-divisionally multiplexed by the multiplexing circuit 1. In the receiver, the demultiplexing circuit 2 demultiplexes the multiplexed signal from the transmitter into the original signals. The original signals are identified on the basis of the sync pattern detected from the original signal to determine the output positions of the original signals. With this operation, unlike in the conventional system, cell multiplexing need not be performed in accordance with each signal output position of the demultiplexing circuit in the receiver. Even when broadcast signals such as CATV signals are to be distributed, therefore, a decrease in transmission line utilization efficiency can be prevented.

In the transmitter, a plurality of signals having arbitrary frame lengths and clock-synchronized at the same signal rate (bit/s), which include a signal having a sync pattern, are multiplexed by the multiplexing circuit 1 in a predetermined order to be transmitted. The receiver further includes the frame synchronization circuit 3 for detecting a sync pattern from the signal output from a predetermined output position of the demultiplexing circuit 2. When no sync pattern is detected, the bit rotate signal is output from the frame synchronization circuit 3. In accordance with this bit rotate signal, the demultiplexing circuit 2 sequentially changes the output positions and the data phases of the original signals. With this operation, predetermined signals can be output to predetermined output positions with a simple circuit arrangement.

In addition, it suffices if the signals to be multiplexed are clock-synchronized at the same signal rate, e.g., a general signal rate of 150 Mbits/s, but they need not be frame-synchronized. For this reason, the multiplexing circuit 1 and the demultiplexing circuit 2 can perform bit multiplexing and bit demultiplexing, respectively. Therefore, the multiplexing circuit 1 and the demultiplexing circuit 2 need not have complicated functions, and can be realized by simple arrangements. In addition, since the transmission delay time is short, a high-speed operation can be realized.

Instead of using the sync pattern that a specific signal originally has, the transmitter may insert a sync pattern in a specific signal in advance. Alternatively, a dedicated signal as a signal having a sync pattern may be multiplexed with other signals.

FIG. 2 shows a multiplex transmission system according to the second embodiment of the present invention. The same reference numerals in FIG. 2 denote the same parts as in FIG. 1.

According to the first embodiment, in the receiver, the signal output positions of the demultiplexing circuit 2 are changed in accordance with the bit rotate signal X. In contrast to this, in the second embodiment, signals A to D are switched/connected to predetermined output positions by a switch 17 arranged on the subsequent stage of a demultiplexing circuit 12 for outputting the signals A to D in a fixed manner.

More specifically, frame synchronization circuits 13 to 16 for detecting a predetermined sync pattern from a signal are respectively arranged for outputs E to H of the demultiplexing circuit 12. The switch 17 for switching/connecting the outputs E to H from the demultiplexing circuit 12 to outputs I to L is arranged on the subsequent stage of the frame synchronization circuits 13 to 16.

When, for example, a signal obtained by multiplexing the four signals A to D is received from the transmission system, the multiplexed signal is demultiplexed by the demultiplexing circuit 12, as in the above embodiment. In the initial state, the signals C, D, A, and B are output to the outputs E to H in the order named in accordance with the signal phases.

In this case, since the signal A, which has an STM-1 sync byte as a sync pattern, is output as the output G of the demultiplexing circuit 12, the sync pattern is detected by the corresponding frame synchronization circuit 15. As a result, a control signal R is set at "H" level. Meanwhile, since no sync pattern is detected by the frame synchronization circuits 13, 14, and 16, corresponding control signals P, Q, and S are set at "L" level. The switch 17 determines the relationship between the outputs E to H and the outputs I to L on the basis of the "H"-level control signal R.

The following table shows the relationship between the inputs and outputs of the switch 17. As indicated by this table, each of the input signals E to H is determined to be output as a specific one of the outputs I to L on the basis of a corresponding one of the levels of the control signals P to S.

| Input | | | | Output | | | |
|---|---|---|---|---|---|---|---|
| P | Q | R | S | I | J | K | L |
| H | L | L | L | H | E | F | G |
| L | H | L | L | E | F | G | H |

-continued

| Input | | | | Output | | | |
|---|---|---|---|---|---|---|---|
| P | Q | R | S | I | J | K | L |
| L | L | H | L | F | G | H | E |
| L | L | L | H | G | H | E | F |

According to this table, when only the control signal R is at "H" level, as in the above case, the outputs F, G, H, and E from the demultiplexing circuit 12 are obtained as the outputs I, J, K, and L from the switch 17. As a result, the signals A, B, C, and D are output as the outputs I, J, K, and L from the switch 17.

According to this embodiment, one of the frame synchronization circuits 13 to 16 detects a predetermined sync pattern from one of the signals demultiplexed and output from the demultiplexing circuit 12 in the receiver, and the relationship between the outputs E to H from the demultiplexing circuit 12 and the outputs I to L is changed in accordance with the control signal output in accordance with the detection of the sync pattern. With this operation, predetermined signals can be output from desired output positions within a shorter period of time.

Figure 3:
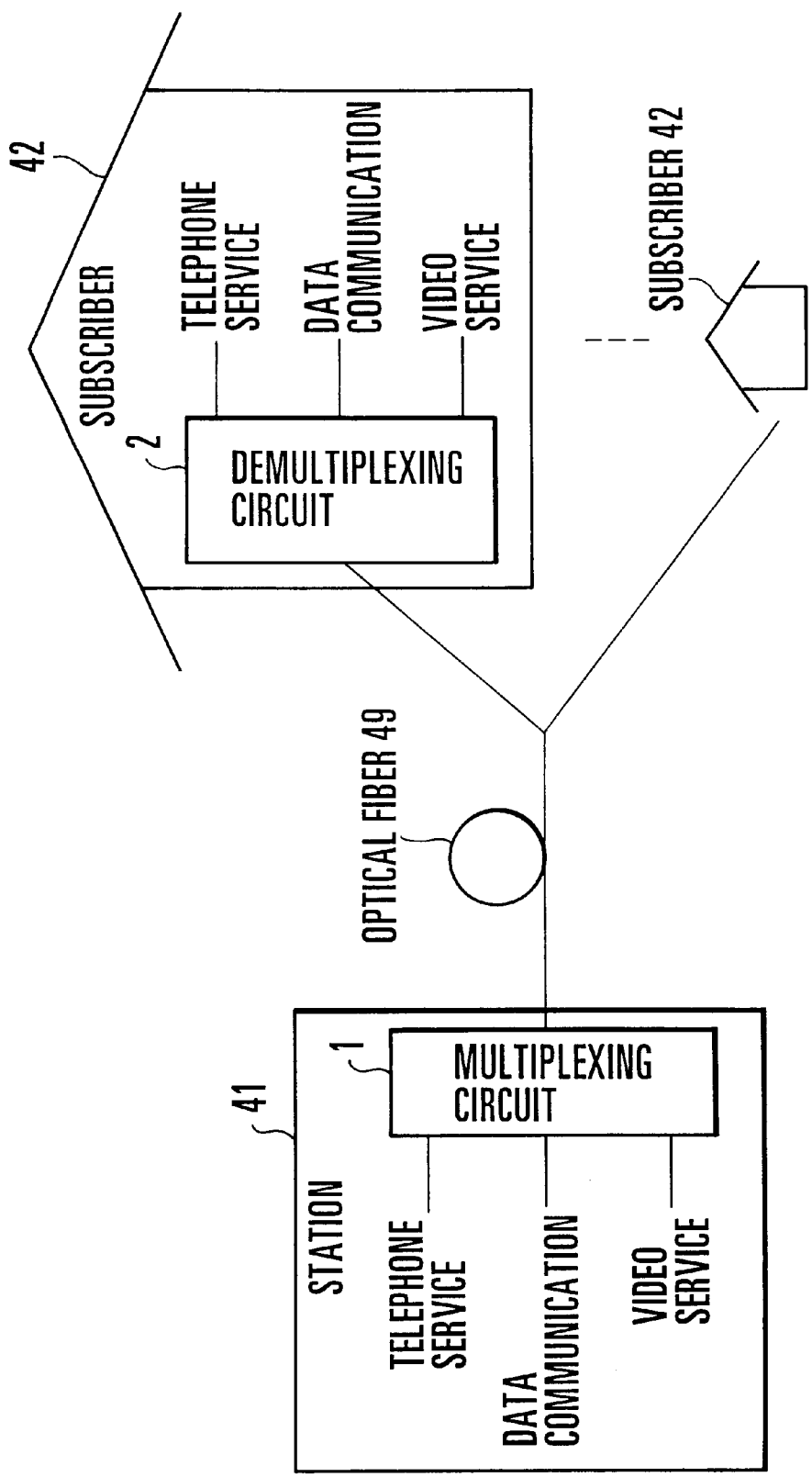
FIG. 3 is a block diagram showing a case in which the present invention is applied to a high-speed optical subscriber system.
Figure 4:
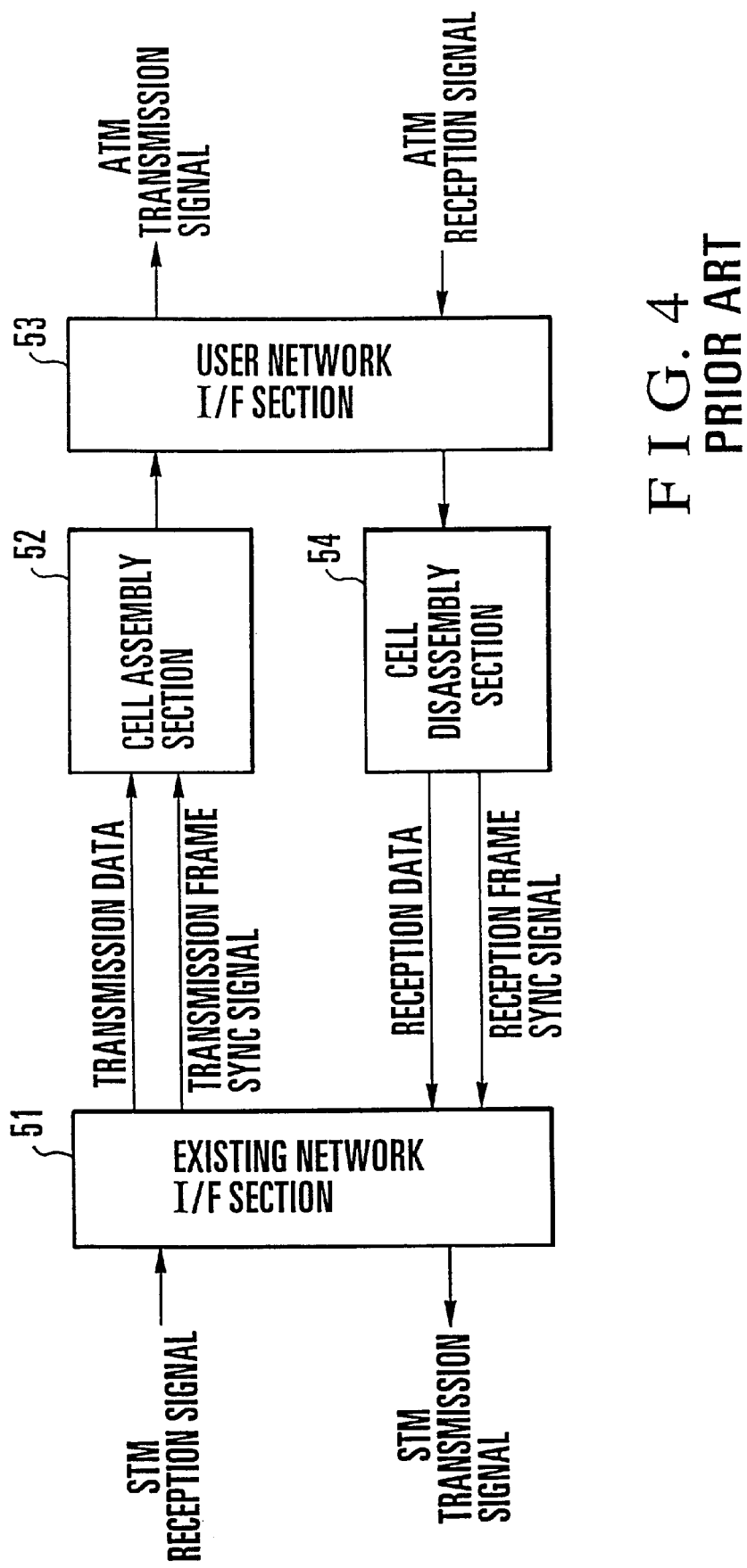
FIG. 4 is a block diagram showing a conventional cell multiplex transmission system.

FIG. 3 explains a case in which the present invention is applied to a high-speed optical subscriber system for transmitting large-volume signals to the respective subscribers (homes) through optical fibers. Referring to FIG. 3, identical signals are distributed from a station 41 to subscribers 42 through a PDS system using an optical fiber 49, and pieces of information are selected and communicated for the respective subscribers.

As the services provided for the respective subscribers 42, a telephone service, a data communication service, a broadcast service, and the like can be conceived. In the broadcast service, in particular, all signals are distributed to the subscribers, and only necessary images are selected to be output. On the station side, data associated with these various services are accommodated in STM-1 frames with a signal rate of 150 Mbits/s, ATM cells, or signals having unique frames. These frames, cells, or signals are then bit-multiplexed by the multiplexing circuit 1 to be transmitted.

In this case, one of the signals to be multiplexed is set as a reference signal, and a sync signal, i.e., a sync pattern, is inserted in, for example, one SOH (Section OverHead) portion of an STM-1 frame. On the reception side, the above demultiplexing circuit 2 (12) and the frame synchronization circuit (not shown) are used to output the signals from the demultiplexing circuit 2 in correspondence with the respective ports according to the procedure in the first or second embodiment. Thereafter, processing for each application is performed. With this operation, various services can be realized with a simple arrangement.

As has been described above, according to the present invention, unlike in the conventional system, cell multiplexing need not be performed in accordance with each signal output position in the receiver. Even when broadcast signals such as CATV signals are to be distributed, therefore, a decrease in transmission line utilization efficiency can be prevented.

In addition, when no sync pattern is detected in the receiver, the output positions (data phases) of digital signals are changed. The respective digital signals can therefore be output to predetermined output positions with relatively simple processing.

Furthermore, since the respective digital signals are switched/output to predetermined output positions by using the switch, the digital signals can be output from desired output positions within a shorter period of time. Since no arrangement for processing in units of frames is required, the transmission delay time is short, and a high-speed operation can be realized.

What is claimed is:

1. A multiplex transmission method comprising the steps of:

transmitting a plurality of digital signals having different frame lengths and bit-synchronized at the same signal rate upon multiplexing the signals in a predetermined order, comprising transmitting one digital signal including a predetermined sync pattern and at least one digital signal which does not include the predetermined sync pattern upon multiplexing the signals;

demultiplexing a received multiplexed signal;

detecting a predetermined sync pattern from each digital signal obtained by demultiplexing, comprising detecting the sync pattern from a digital signal output from a predetermined output position, and sequentially changing the output positions of the digital signals until the sync pattern is detected when the sync pattern is not detected within a predetermined period of time; and determining an output position of each digital signal on the basis of the sync pattern detection result, comprising holding the output position of the digital signal when the sync pattern is detected.

2. A multiplex transmission method comprising the steps of:

transmitting a plurality of digital signals having different frame lengths and bit-synchronized at the same signal rate upon multiplexing the signals in a predetermined order, comprising transmitting one digital signal including a predetermined sync pattern and at least one digital signal which does not include the predetermined sync pattern upon multiplexing the signals;

demultiplexing a received multiplexed signal;

detecting a predetermined sync pattern from each digital signal obtained by demultiplexing, comprising detecting sync patterns from all digital signals obtained by demultiplexing; and determining an output position of each digital signal on the basis of the sync pattern detection result, comprising setting the output positions of the digital signals on the basis of the detection result on all sync patterns.

3. A method according to claim 1, wherein the step of transmitting the digital signals comprises further the step of transmitting the digital signals upon multiplexing the signals by bit multiplexing, and the step of demultiplexing the multiplexed signal comprises the step of bit-demultiplexing the bit-multiplexed signal.

4. A multiplex transmission system comprising a transmitter for transmitting a plurality of digital signals upon multiplexing the signals and a receiver for outputting digital signals obtained by demultiplexing a multiplexed signal from said transmitter to predetermined output positions, said transmitter including:

multiplexing means for multiplexing a plurality of digital signals having different frame lengths and bit-synchronized at the same signal rate, one of the digital signals including a predetermined sync pattern and at least one digital signal which does not include the predetermined sync pattern, and said receiver including:

demultiplexing means for outputting digital signals obtained by demultiplexing a signal from said transmission system to output positions corresponding to signal phases, and the output positions of the digital signals changing in accordance with a designation signal, and synchronization detection means for detecting a sync pattern from a digital signal output from a predetermined output signal of said demultiplexing means, and outputting the designation signal to said demultiplexing means when the sync pattern is not detected within a predetermined period of time, wherein said demultiplexing means switches the output positions of the digital signals by changing the signal phases of the digital signals in accordance with the designation signal.

5. A system according to claim 4, wherein said multiplexing means multiplexes the respective digital signals by bit multiplexing, and said demultiplexing means bit-demultiplexes a signal from said transmitter.

6. A method according to claim 2, wherein the step of transmitting the digital signals further comprises the step of transmitting the digital signals upon multiplexing the signals by bit multiplexing, and the step of demultiplexing the multiplexed signal comprises the step of bit-demultiplexing the bit-multiplexed signal.

* * * * *